Patented Jan. 23, 1934

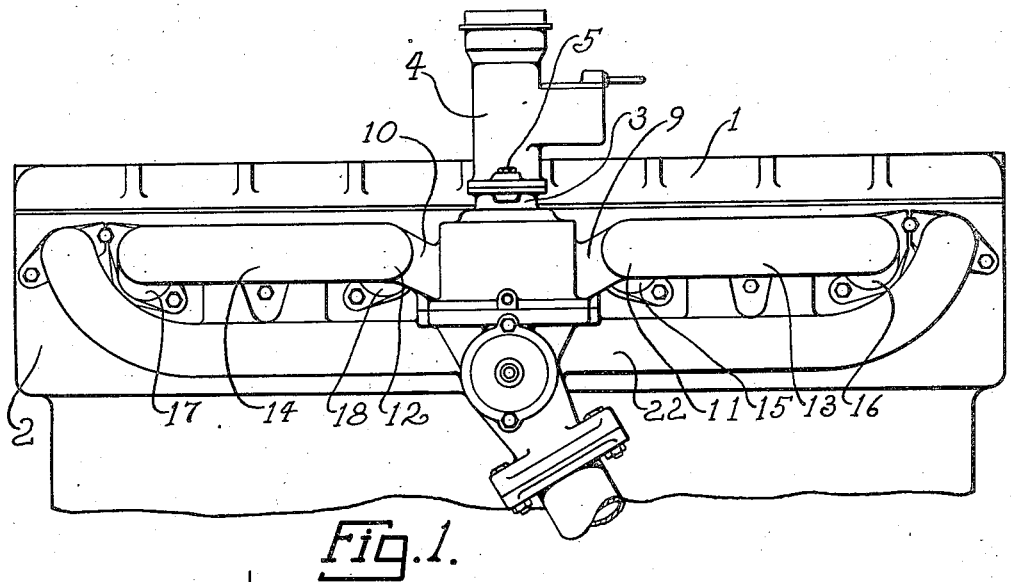
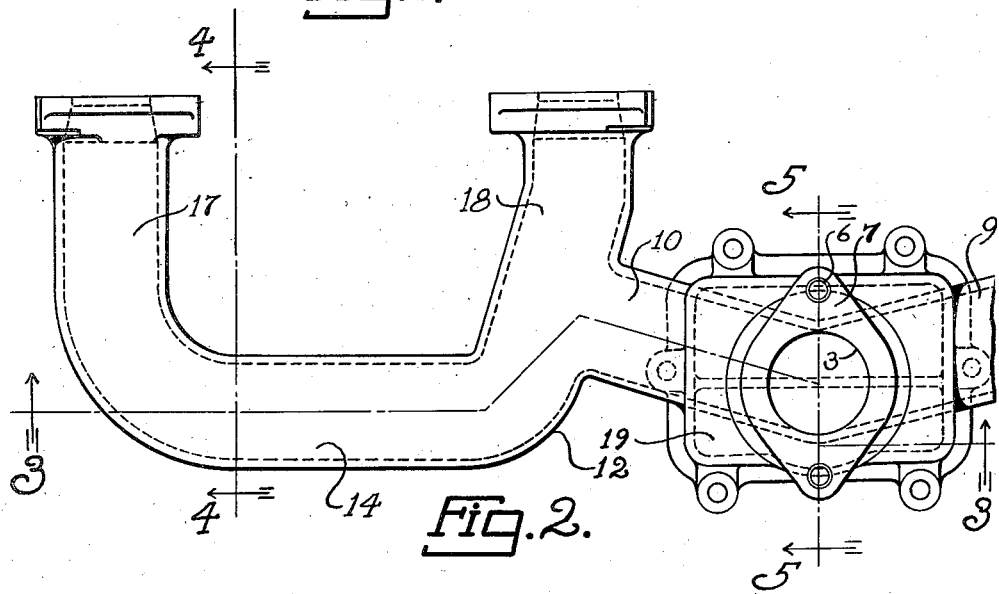
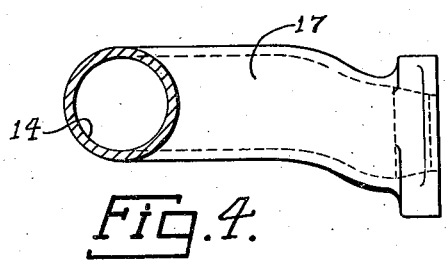

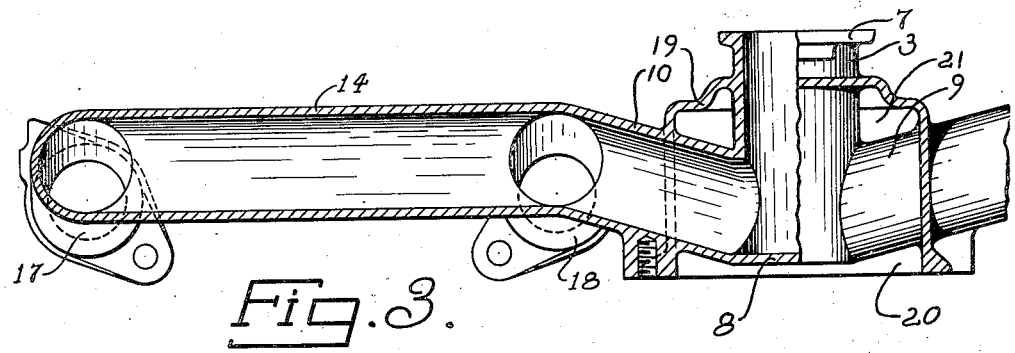
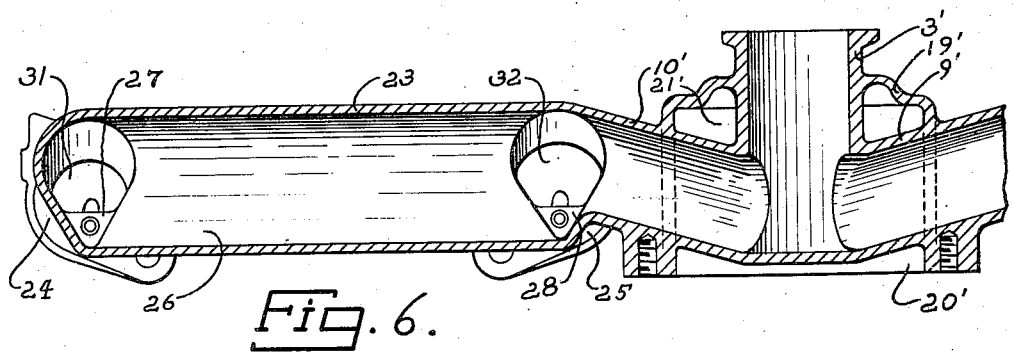
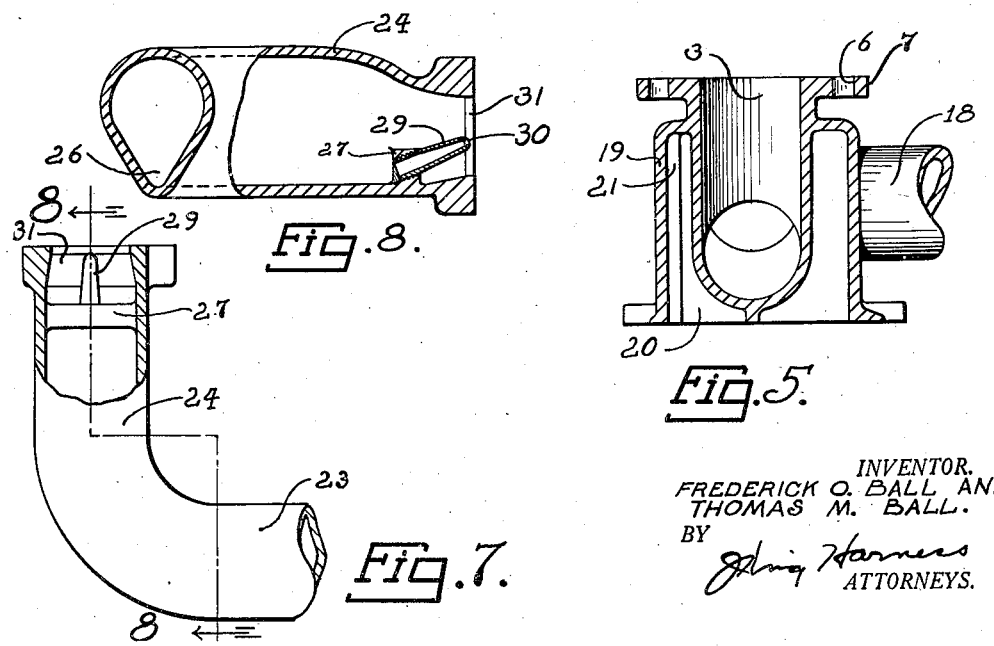
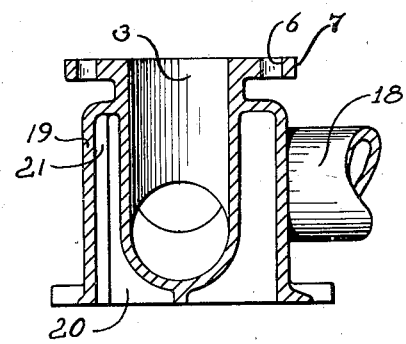

1,944,206

UNITED STATES PATENT OFFICE 1,944,206

MANIFOLD

Frederick O. Ball and Thomas M. Ball, Detroit, Mich., assignors to Chrysler Corporation, Detroit, Mich., a corporation of Delaware Application April 22, 1931. Serial No. 532,032

13 Claims. (Cl. 123—52)

This invention relates to an improved intake manifold for an internal combustion engine.

The main objects of the invention are to provide direct and substantially straight passages in a manifold of this kind which lead from a primary zone of distribution to a secondary zone; to provide passages of this character which slope downwardly toward the primary zone of distribution so as to form a trap for collecting the fuel which remains in a liquid state as it is discharged from a carburetor; to provide branch passages which are substantially in alignment at their adjacent ends for conducting fuel mixture in substantially equal quantities from each secondary zone of distribution to the various cylinders of one end of an engine; to provide branch passages leading from the secondary zones of distribution which extend substantially perpendicular with respect to the passages connecting the primary and secondary zones of distribution so as to cause an equal division of the fuel mixture which flows from the primary zone of distribution to the secondary distribution zones; and to provide branch passages of this character which evenly distribute the fuel that enters the secondary zone of distribution between the cylinders with which the branch passages communicate.

Further objects of the invention are to provide troughs in the branch passages leading from the secondary zones of distribution of a manifold for receiving the fuel which collects therein in a liquid state; to provide inclined portions at the outlet ends of the branch passages for directing the flow of liquid fuel in the troughs toward the outlets of the branch passages; to provide dams at the opposite extremities of the troughs for preventing an uneven and spasmodic flow of liquid fuel into the cylinders of an engine; and to provide nozzles in the dams for feeding the liquid fuel that collects in the troughs through the outlet end portions of the branches in uniform, metered jets by the currents of mixtures of vaporized and atomized fuel and air which flow through the branch passages during operation of the engine.

An illustrative embodiment of the invention is shown in the accompanying drawings, in which:

Fig. 1 is a fragmentary side elevation of an internal combustion engine which is equipped with our improved intake manifold.

Fig. 2 is an enlarged fragmentary plan view showing the rear half section of the manifold in detail.

Fig. 3 is a horizontal section taken on the line 3—3 of Fig. 2.

Fig. 4 is a transverse vertical section taken on the line 4—4 of Fig. 2.

Fig. 5 is a vertical section taken on the line 5—5 of Fig. 2.

Fig. 6 is a vertical section, similar to Fig. 3, but showing a further development of the invention.

Fig. 7 is a fragmentary plan view of the outlet end portion of the rear branch of the manifold shown in Fig. 6.

Fig. 8 is a vertical section taken on the line 8—8 of Fig. 7.

In the form shown in Figs. 1 to 5 inclusive, our improved manifold is illustrated in conjunction with a multi-cylinder internal combustion engine 1 which includes a cylinder block 2 having adjacent fuel inlet ports each communicating with two combustion chambers of the engine. The manifold includes an inlet pipe 3 having an open extremity with which the fuel mixture passage of a carburetor 4 communicates. The carburetor 4 is removably attached to the upper end of the inlet pipe 3 by bolts 5 which are threaded in apertures 6 of flanges 7 on the upper open end of the inlet pipe. The lower end of the inlet pipe 3 is closed by a wall 8.

Communicating with the interior of the lower end portion of the inlet pipe 3 is a pair of upwardly inclined substantially straight branch tubes 9 and 10 which are integrally formed with the opposite side portions of the inlet pipe. The outer ends of the branch pipes 9 and 10 communicate with yoke-shaped tubular members or conduits 11 and 12 which include substantially horizontal intermediate portions 13 and 14 that extend longitudinally of the engine 1, and downwardly inclined end sections 15 and 16, and 17 and 18, respectively, which extend transversely with respect to the length of the engine. The passages in the branch tubes 9 and 10 are substantially perpendicular to the passages in the end sections 15 and 18, respectively, with which they connect. This relation assures a substantially equal distribution of the fuel mixture which flows from the lower end portion of the inlet tube 3 between the outlets at the ends of the yoke-shaped tubular members 13 and 14, respectively.

The lower end portion of the inlet tube 3 and the converging ends of the branch pipes 9 and 10 are enclosed within a cup-shaped casing 19 having an opening 20 in its lower end. This casing provides a chamber 21 which surrounds the joined end portions of the branch 9 and 10 and inlet pipe 3 for receiving hot exhaust gases that are admitted through the opening 20 from the interior of the exhaust manifold 22 which communicates at its central portion with the open end of the casing. The fuel mixture is heated in this way at the primary zone of distribution.

That portion of the fuel charge which enters the primary zone of distribution in a liquid state accumulates at the adjacent ends of the upwardly inclined branch pipes 9 and 10 where it is subjected to the heat of the exhaust gases and ultimately vaporized. The upward inclination of the branch pipes prevents fuel in a liquid state from flowing into the secondary zones of distribution at the junction of the outer ends of the branch pipes 9 and 10 and the yoke-shaped tubular members 13 and 14. In this manner, a trap is formed for retaining the liquid portion of the fuel charge in the primary zone of distribution until it is vaporized.

The vaporized and atomized fuel mixture which is fed from the carburetor 4 to the inlet pipe 3 flows into the primary zone of distribution from which it is conducted directly to secondary zones by the straight branch pipes 9 and 10. That portion of the fuel charge which remains in a liquid state runs down the inclined branch pipes and collects in the trap at the lower end portion of the pipe 3 where it is vaporized by the heat of the exhaust gases. As the fuel charge leaves the outer ends of the branch pipes 9 and 10 it flows into the passages of the adjacent end sections 15 and 18 of the yoke-shaped tubular members 13 and 14 which extend substantially normal to the passages of the branch pipes 9 and 10, respectively. The perpendicular relationship of the branch pipes and the passages of the adjacent sections of the yoke-shaped conduits causes the fuel charges to strike against the other walls of the end sections 15 and 18, and prevents the direction of the flow of the charges from the primary zone of distribution from favoring either outlet end of the yoke-shaped tubular members. In this manner, equal distribution of the mixture is assured between the pairs of cylinders with which the respectively opposite ends of each yoke-shaped tubular member communicate.

In the form shown in Figs. 6 to 8 inclusive, the central portions of our improved intake manifold are substantially identical in construction to that shown in Figs. 1 to 5 inclusive. The intermediate portion of the manifold includes an inlet pipe 3' with which upwardly inclined branch pipes 9' and 10' communicate. The joined ends of the inlet pipe 3' and branch pipes 9' and 10' are enclosed within a casing 19' having an open lower end 20' for admitting exhaust gases.

The upwardly inclined branch pipes 9' and 10' communicate with yoke-shaped tubular conduits 23 which include substantially horizontal intermediate portions and downwardly inclined end sections 24 and 25. The passages in the inner end sections 25 of the yoke-shaped tubular members extend substantially normal to the passages in the branch pipes 9' and 10' so as to produce an equal distribution of the fuel which enters the tubular members 23 between the respectively opposite ends thereof.

The cross sections of the yoke-shaped tubular members 23 differ from the circular cross sections of the yoke-shaped members 13 and 14, shown in Figs. 1 to 5, inclusive, in that they have constricted lower portions of substantially U-shaped contour which provide troughs 26 that extend substantially from end to end of each yoke-shaped tubular member 23. Provided in the trough 26 of each yoke-shaped tubular member are baffles or dams 27 and 28 which are located in close proximity to the outlet ends of the sections 24 and 25, respectively. These baffles prevent liquid fuel which condenses and collects in the yoke-shaped tubular members from spasmodically flowing directly into the cylinders in non-uniform quantities.

Each baffle has an aperture in which is mounted an upwardly inclined nozzle 29 having a constricted outlet orifice 30 which is located at the central portion of the current of fuel mixture which flows through the outlets 31 and 32 of the yoke-shaped tubular members. The fuel which collects in the troughs 26 is fed through the nozzles 29 in a comparatively fine stream by the action of the main portion of the fuel mixture as it flows through the passages in the end portions 24 and 25 of the yoke-shaped members 23 at a comparatively high velocity. The liquid portion of the fuel charge is sprayed into the remaining fuel mixture in a fine stream which readily atomizes or breaks up into small particles which are suitable for combustion.

Although but several specific embodiments of this invention have herein been shown and described, it will be understood that various changes in the size, shape and arrangement of parts may be made without departing from the spirit of our invention and it is not our intention to limit its scope other than by the terms of the appended claims.

What we claim is:

1. A manifold including a fuel mixture inlet tube, a pair of substantially straight branch tubes communicating with said inlet tube and leading upwardly at an inclination to a horizontal plane from the discharge end thereof, and a pair of conduits, each having an intermediate portion substantially perpendicular to and communicating with one branch tube respectively, and each having a pair of outlets for feeding fuel mixture to a pair of cylinders respectively.

2. A manifold including a substantially vertical fuel mixture inlet tube, a substantially straight branch tube communicating with said inlet tube and extending upwardly from the discharge end of said inlet at an inclination to a horizontal plane, and a conduit having open ends and including a passage having a substantially straight intermediate portion substantially perpendicular to and communicating with said branch tube for evenly distributing fuel to the opposite open ends of said conduit.

3. A manifold including a substantially vertical inlet pipe having a closed inner extremity, a pair of substantially straight branch passages upwardly inclined from and communicating with the discharge end of said inlet pipe and providing a trap for receiving liquid fuel, and a pair of yoke-shaped conduits, each having a substantially straight portion substantially perpendicular to and communicating with only one branch tube respectively.

4. A manifold including a substantially vertical inlet pipe having a closed inner extremity, a pair of branch passages inclined upwardly from and communicating with the inner end of said inlet pipe and providing a trap for receiving liquid fuel, and a pair of conduits, each having discharge openings at their extremities for feeding fuel to the inlet ports of adjacent cylinders of an engine an intermediate portion substantially perpendicular to and communicating with one branch tube respectively, and a casing surrounding the adjacent portions of said inlet pipe and branch tubes having an open extremity for admitting a heating medium so as to vaporize the liquid fuel which collects in said trap.

5. In a multiple cylinder internal combustion engine, a manifold including a substantially vertical inlet pipe, an upwardly inclined branch tube communicating with said inlet pipe, and a tubular yoke member communicating with said inlet pipe including a substantially horizontal central portion and having downwardly inclined end portions communicating with adjacent groups of cylinders of said engine.

6. In a multiple cylinder internal combustion engine, a manifold including a pair of yoke shaped tubular members each having a substantially horizontal section extending longitudinally of said engine and having downwardly inclined substantially straight end portions communicating with adjacent groups of said cylinders, a pair of intersecting branch tubes, one extending substantially perpendicular to and communicating with a straight end portion of each yoke shaped member respectively, and an inlet pipe communicating with the intersecting portion of said branch tubes.

7. In a multiple cylinder internal combustion engine, a manifold including a pair of yoke shaped tubular members each having a substantially horizontal section extending longitudinally of said engine and having downwardly inclined substantially straight end portions communicating with adjacent groups of said cylinders, a pair of intersecting branch tubes, one communicating with a straight end portion of each yoke shaped member respectively, and an inlet pipe communicating with the intersecting portion of said branch tubes.

8. In a multiple cylinder internal combustion engine, a manifold including a pair of yoke shaped tubular members each having a substantially horizontal section extending longitudinally of said engine and having downwardly inclined substantially straight end portions communicating with adjacent groups of said cylinders, a pair of inclined branch tubes intersecting at their adjacent extremities below the elevation of said yoke shaped members, one communicating with a straight end portion of each yoke shaped member respectively, and an inlet pipe communicating with the intersecting portion of said branch tubes.

9. In a multiple cylinder internal combustion engine, a manifold including a tubular member having a fuel mixture inlet and having a trough extending substantially throughout the length thereof and located below said fuel mixture inlet for collecting liquid fuel, said tubular member having spaced outlets communicating with adjacent groups of the cylinders of said engine, dams in said trough, one located in advance of each outlet and a nozzle mounted on each dam having an inlet communicating with said trough and a metered outlet for discharging the liquid fuel from said trough toward the adjacent outlet of said manifold.

10. A manifold including a tubular member having a trough for collecting liquid fuel and having an inlet and pair of spaced outlets, a pair of dams, one extending across said trough in advance of each outlet, and an upwardly inclined nozzle mounted on each dam having an inlet communicating with said trough and a metered discharge opening directed toward the adjacent outlet of said manifold and located centrally of the passage in said tubular member.

11. In a manifold, a tubular member having a trough therein for collecting liquid fuel and including a substantially horizontal longitudinal portion and downwardly inclined transverse branches having open ends, dams in said trough in advance of the open ends of said branches, and a nozzle mounted on each dam having an inlet communicating with said trough each having a discharge opening located centrally of the adjacent open ends of said passages respectively adapted to spray liquid fuel therethrough.

12. A manifold including a fuel mixture inlet tube, a branch tube communicating with said inlet tube, a conduit having an intermediate portion substantially perpendicular to said branch tube and communicating with the latter for evenly distributing fuel mixture to the opposite ends of said conduit, a trough formed in the lower wall of said conduit for receiving liquid fuel, and outwardly inclined means in said conduit in advance of the ends thereof for directing the fuel from said trough through the ends of said conduit and into the central portion of the interior of said tubular member.

13. In a multiple cylinder internal combustion engine, a manifold including an inlet tube, a branch tube leading from said inlet tube, a tubular member communicating with said branch tube and having a trough extending substantially throughout its entire length and located below the outlet end of said branch tube for collecting liquid fuel, said tubular member having spaced outlets communicating with adjacent groups of the cylinders of said engine, and dams in said trough, one located in advance of each outlet and having constricted apertures therein for metering the flow of liquid fuel from said trough to said outlet.

FREDERICK O. BALL.
THOMAS M. BALL.